(12) United States Patent
Vickers et al.

(10) Patent No.: US 10,809,884 B2
(45) Date of Patent: Oct. 20, 2020

(54) PAINT COLOR SELECTION AND DISPLAY SYSTEM AND METHOD

(71) Applicant: The Sherwin-Williams Company, Cleveland, OH (US)

(72) Inventors: Meghan L. Vickers, Cleveland, OH (US); Lori A. Domanick, Cleveland, OH (US); Todd Roeth, Columbus, OH (US); Kirby Evans, Columbus, OH (US)

(*) Notice: Subject to any disclaimer, the term of this patent is extended or adjusted under 35 U.S.C. 154(b) by 11 days.

(21) Appl. No.: 16/181,730

(22) Filed: Nov. 6, 2018

(65) Prior Publication Data

US 2019/0138168 A1   May 9, 2019

Related U.S. Application Data

(60) Provisional application No. 62/660,462, filed on Apr. 20, 2018, provisional application No. 62/581,896, filed on Nov. 6, 2017.

(51) Int. Cl.
*G06F 3/048* (2013.01)
*B44B 3/02* (2006.01)
(Continued)

(52) U.S. Cl.
CPC .......... *G06F 3/0482* (2013.01); *B44D 3/003* (2013.01); *B44D 3/02* (2013.01); *G01J 3/463* (2013.01);
(Continued)

(58) Field of Classification Search
CPC combination set(s) only.
See application file for complete search history.

(56) References Cited

U.S. PATENT DOCUMENTS 5,844,542 A   12/1998 Inoue et al.
6,502,049 B1  12/2002 Takada et al.
(Continued)

FOREIGN PATENT DOCUMENTS

CN   2340001   9/1999
EP   1359399   5/2003
(Continued)

OTHER PUBLICATIONS

Lebow et al., "Classification of Wood Surface Features by Spectral Reflectance", Jan. 1996. Wood and Fiber Science, vol. 28(1), 1996., pp. 74-90.
(Continued)

*Primary Examiner* — Wesner Sajous
(74) *Attorney, Agent, or Firm* — Patterson Thuente Pedersen, P.A.

(57) ABSTRACT

A color selection and display system. A computing device comprises a display, a memory storing a color matrix comprising a plurality of virtual paint chips each virtual paint chip representing a specified paint color, a user interface configured for receiving input data identifying a selected color and a processor configured to control the display to automatically display the color matrix such that the selected color is highlighted in the virtual paint chip arrangement. In embodiments, a retail paint chip display comprises a plurality of paint chips in a specified layout such that the relative location of each virtual paint chip in the color matrix corresponds to the layout of the retail paint chip display. In embodiments, a rendered scene is displayed based on a base image and at last one paintable surface defined by a plurality of locations in the base image.

19 Claims, 16 Drawing Sheets

(51) Int. Cl.
  *B44B 3/00*    (2006.01)
  *G06T 11/00*   (2006.01)
  *G01J 3/46*    (2006.01)
  *G06Q 30/06*   (2012.01)
  *G06F 3/0482*  (2013.01)
  *B44D 3/02*    (2006.01)
  *B44D 3/00*    (2006.01)
  *G06F 3/0484*  (2013.01)
  *G06F 3/0481*  (2013.01)
  *G06F 3/0488*  (2013.01)

(52) U.S. Cl.
  CPC ...... *G06F 3/04817* (2013.01); *G06F 3/04842* (2013.01); *G06F 3/04845* (2013.01); *G06Q 30/0621* (2013.01); *G06T 11/001* (2013.01); *G06F 3/0488* (2013.01); *G06F 3/04815* (2013.01)

(56) References Cited

U.S. PATENT DOCUMENTS

| | | |
|---|---|---|
| 6,556,303 B1 | 4/2003 | Rangarajan et al. |
| 6,641,696 B1 | 11/2003 | Edgerton |
| 6,744,513 B2 | 6/2004 | Kubo et al. |
| 7,042,566 B2 | 5/2006 | Skierski et al. |
| 7,116,420 B2 | 10/2006 | Skierski et al. |
| 7,180,524 B1 | 2/2007 | Axelrod |
| 7,230,707 B2 | 6/2007 | Ingleson et al. |
| 7,430,316 B2 | 9/2008 | Boston et al. |
| 7,796,296 B2 | 9/2010 | Martinez et al. |
| 7,935,274 B2 | 5/2011 | Sara et al. |
| 7,999,825 B2 | 8/2011 | Webb et al. |
| 8,244,032 B2 | 8/2012 | Sara et al. |
| 8,319,788 B2 | 11/2012 | Buzyn et al. |
| 8,517,267 B2 | 8/2013 | Reynolds et al. |
| 8,752,762 B2 | 6/2014 | Woelfel et al. |
| 9,152,311 B2 | 10/2015 | Buzyn et al. |
| 9,530,163 B2 | 12/2016 | Buzyn et al. |
| 9,563,342 B2 | 2/2017 | Reynolds et al. |
| 9,619,052 B2 | 4/2017 | Bergstein et al. |
| 9,639,983 B2 | 5/2017 | Buzyn et al. |
| 9,857,888 B2 | 1/2018 | Reynolds et al. |
| 9,971,487 B2 | 5/2018 | Buzyn et al. |
| 2003/0151611 A1 | 8/2003 | Turpin et al. |
| 2004/0093112 A1 | 5/2004 | Marchand et al. |
| 2004/0131756 A1 | 7/2004 | Skierski et al. |
| 2004/0223149 A1 | 11/2004 | Skierski et al. |
| 2005/0219561 A1 | 10/2005 | Haikin |
| 2006/0210153 A1 | 9/2006 | Sara et al. |
| 2008/0218814 A1 | 9/2008 | Ferlitsch |
| 2009/0231356 A1 | 9/2009 | Barnes et al. |
| 2011/0210978 A1 | 9/2011 | Sara et al. |
| 2012/0019572 A1* | 1/2012 | Lim ................ G09G 5/026 345/690 |
| 2012/0138168 A1* | 6/2012 | Richter ............. F23L 11/005 137/409 |
| 2012/0217360 A1* | 8/2012 | Fanning, Jr. ......... A47F 5/0823 248/220.31 |
| 2013/0268871 A1 | 10/2013 | Webb et al. |
| 2015/0178955 A1 | 6/2015 | Topakas et al. |
| 2015/0235389 A1* | 8/2015 | Miller ............. G06Q 30/0627 345/594 |
| 2015/0268098 A1 | 9/2015 | Minchew et al. |
| 2016/0275702 A1 | 9/2016 | Reynolds et al. |
| 2018/0074605 A1 | 3/2018 | Reynolds et al. |
| 2019/0066338 A1* | 2/2019 | Perlman ............... G06T 7/62 |
| 2019/0138168 A1 | 5/2019 | Vickers et al. |
| 2019/0301941 A1* | 10/2019 | Kawabata ............ G01J 3/52 |

FOREIGN PATENT DOCUMENTS

| | | |
|---|---|---|
| FR | 2698982 | 6/1994 |
| JP | 11269411 | 10/1999 |

OTHER PUBLICATIONS

"Blue Stain", U.S. Department of Agriculture, Forest Service, Forest Products Laboratory, 2 pages, (May 2002).

International Search Report for PCT/US2006/009845 dated Jul. 27, 2006.

Application and File History for U.S. Appl. No. 15/800,175, filed Nov. 1, 2017 inventors Vickers et al.

* cited by examiner

PAINT COLOR SELECTION AND DISPLAY SYSTEM AND METHOD

CROSS-REFERENCE TO RELATED APPLICATIONS

This application claims the priority benefit of U.S. Provisional Patent App. No. 62/581,896 filed Nov. 6, 2017, and U.S. Provisional Patent App. No. 62/660,462, filed Apr. 20, 2018, the disclosures of which are incorporated by reference herein.

TECHNICAL FIELD

Embodiments of the present disclosure relate to devices and methods for identifying and selecting colors, for example paint colors, and displaying the selected colors to a user with additional information about the selected colors.

BACKGROUND

In retail paint sales, it is conventional to display the various colors available for purchase using "paint chips." The paint chips are cards that have a sample or swatch of one or more of the colors that are available for purchase. The paint chips also include identifying indicia for the paint color, such as a trademark or name for the paint color, the manufacturer's name, a product number, a barcode, etc.

Paint chips are typically displayed in a retail store in an ordered arrangement upon a display (i.e., a paint chip display). The paint chip display has racks for holding numerous paint chips for inspection by a customer. Individual paint chips within the display may be organized by color; for example, shades of blue are grouped together, shades of red are grouped together, etc.

The paint chip display might include hundreds or thousands of unique colors of paint available for purchase. If a customer is aware of a specific color of paint and would like to inspect the paint chip for that specific color, but does not know the location of the specific color within the paint chip display, it can be challenging for the customer to find the correct paint chip due to the large number of paint chips available for selection.

Even before locating individual paint chips or swatches, customers can face additional challenges when choosing individual colors, or color families to apply to surfaces, such as interior or exterior walls. While computing devices can provide displays of individual paint colors, these two-dimensional swatches may not provide the user with a sense of how a selected color might look when applied to a surface, taking into account variations in lighting, shadows, reflections and other objects.

A number of image editing software applications enable users to edit a selected image to apply colors to areas of their choosing. In these applications, users must generally manually select both the areas on the displayed image on which to apply color, and also the colors to be applied. Further, without sophisticated software and the training necessary to use it, it can be cumbersome to apply a color in a manner that takes into account various differences in how the color will look when applied to a real-world surface. Such applications are also generally arranged to display a limited number of versions of a single image at a time.

SUMMARY

Embodiments of the present disclosure provide a color selection and display system. The system can present a plurality of colors in a matrix format that is arranged to correspond to a physical paint chip layout. Embodiments provide automated display of rendered scenes, each rendered scene having a chosen color applied to at least one paintable surface. Each scene can be represented by a base image and paintable surface data. The base image can be provided by an image sensor on a computing system, from the memory of the computing device, or from a network.

In an embodiment, a color selection and display system includes a computing device comprising a display, a memory storing a color matrix comprising a plurality of virtual paint chips. Each virtual paint chip representing a specified paint color, a user interface configured for receiving input data identifying a selected color, and a processor configured to control the display to automatically display the color matrix such that the selected color is highlighted in the color matrix.

In an embodiment, a retail paint chip display can comprise a plurality of paint chips, each paint chip representing a specified paint color, the plurality of paint chips arranged according to a specified layout. The relative location of each virtual paint chip in the color matrix can correspond to the specified layout of the retail pain chip display.

In an embodiment, the computing device further comprises an orientation sensor configured to generate an orientation signal based on an orientation of the computing device. The processor can be is further configured to receive the orientation of the computing device and to control the display to automatically display the color matrix based on the orientation of the computing device. The computing device can be further configured to display a subset of the plurality of paint colors in a palette.

In an embodiment, the computing device is further configured to store one or more scenes, each scene comprising a base image and at least one paintable surface, the paintable surface defined by a plurality of locations in the base image. The computing device can control the display to automatically display a rendered scene, the rendered scene comprising a display of the base image of a selected scene of the one or more scenes, with a chosen color applied to the at least one paintable surface of the selected scene.

In an embodiment, the computing device can be further configured to display the color matrix such that each virtual paint chip displays the rendered scene such that the chosen color corresponds to the paint color of the virtual paint chip. In an embodiment, the computing device is further configured to display an enlarged version of the rendered scene on the display over the color matrix. In an embodiment, the computing device is further configured to display an enlarged version of the rendered scene, such that the chosen color corresponds to a location of a user contact of the display on the palette. In an embodiment, the computing device is configured to display a zoomed portion of the color matrix.

In an embodiment, the computing device can be configured to change the display to a second rendered scene in response to a user selection of a second selected scene of the one or more scenes. In an embodiment, the computing device can be further configured display to a group of available scenes simultaneously with the rendered scene. The display of the second rendered screen can have a chosen color corresponding to the chosen color of the rendered scene.

In an embodiment, the at least one paintable surface includes intensity information such that the paintable surface can be displayed with the chosen color based on the intensity information.

In an embodiment, the one or more scenes are generated by using a user-provided image as the base image and generating the at least one paintable surface from the base image. The at least one paintable surface can be generated by detecting a wall. In an embodiment, the scene further comprises one or more detected colors.

In an embodiment, the user-provided image is selected from an image in the memory. The user-provided image can be a static image. In an embodiment, the computing device further comprises an image sensor and the user-provided image is provided by the image sensor. In an embodiment, a plurality of user-provided images are streamed from the image sensor and the display of the rendered screen is updated in real-time based on a current user-provided image.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

Figure 1:
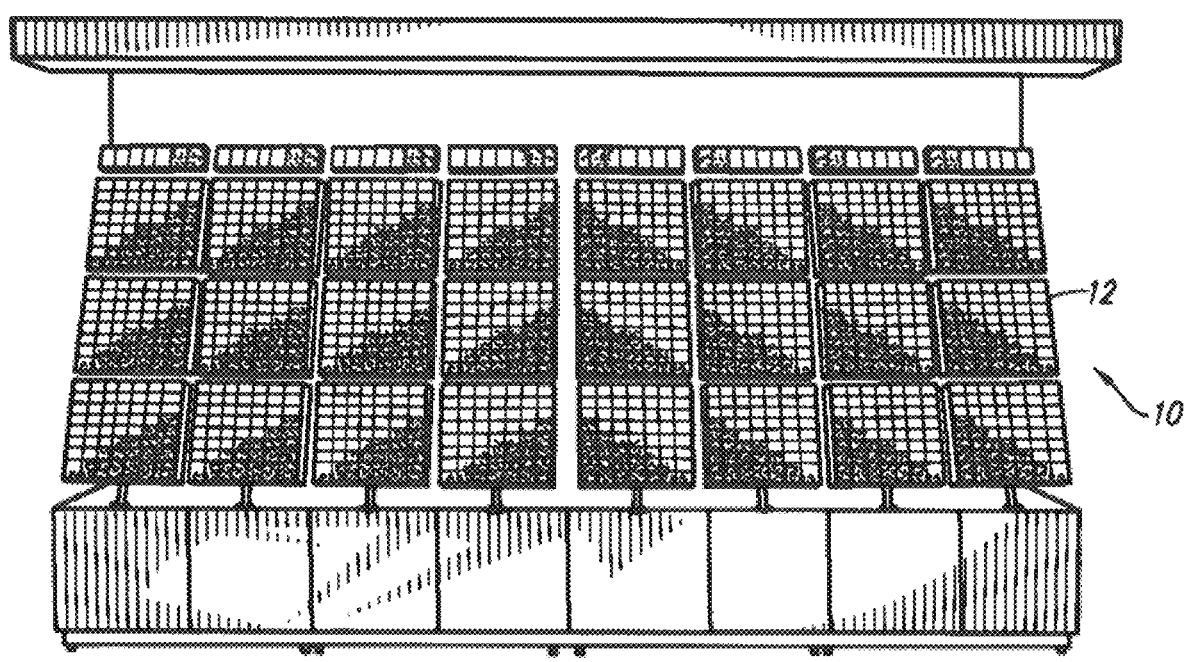
FIG. 1 is a perspective view depicting a paint chip display, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Embodiments of the present disclosure relate to devices and methods for identifying and selecting colors, such as paint colors, and displaying the selected colors and additional information about the selected colors.

FIG. 1 is a diagram depicting a paint chip display 10 as may be found in a retail store, according to an embodiment. The paint chip display 10 includes a plurality of different paint chips 12 that each include samples of the various colors or hues of paint that are available for purchase and their respective identifying indicia (such as name, product number, etc.) Due to the large number of different paint chips 12 in the paint chip display 10, it can be difficult for a customer to find a particular desired paint chip within the display, unless the customer is already aware of the location of the paint chip. The embodiments discussed herein can, among other things, assist a customer in locating a desired paint chip within the paint chip display 10. The color selection and display device of the present disclosure is configurable for use with any type of paint chip display and therefore is not limited to use with the display 10.

Figure 2:
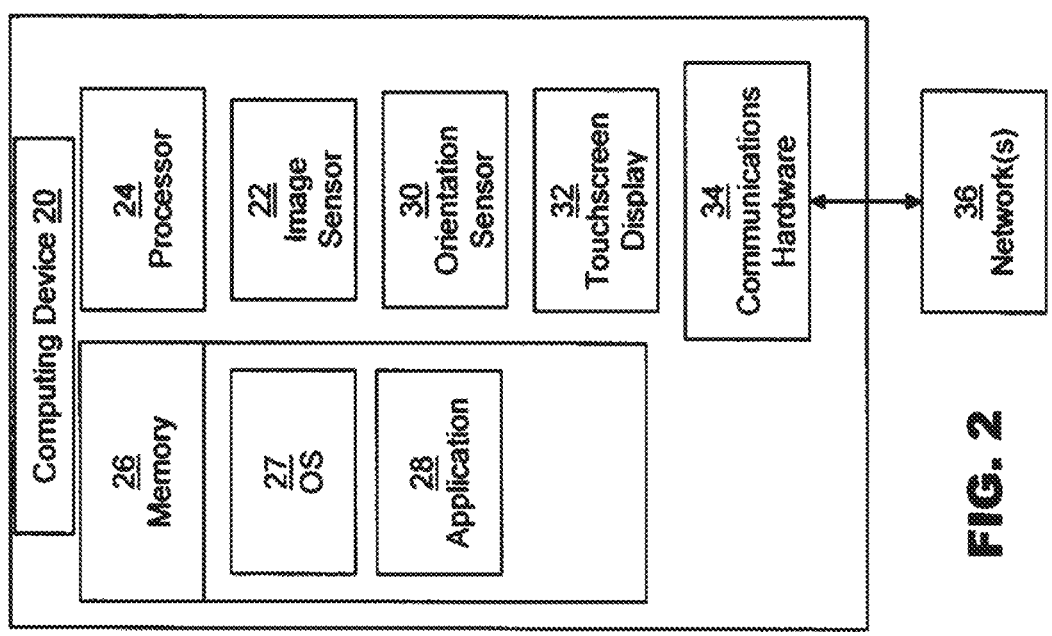
FIG. 2 is a block diagram depicting components of a computing device, according to an embodiment.

FIG. 2 is a block diagram depicting various components of computing device 20, according to an embodiment. Computing device 20 can execute a color selection program or application 28 as discussed herein. The computing device 20 can be a handheld device, such as a tablet or notebook computer, mobile communications device (e.g., smartphone), or the like.

Computing device 20 can include an image capturing device 22 (e.g. camera) electronically connected to at least one processor 24. Image capturing device 22 can be used to capture color images or images having identifying indicia for paint colors (for example, from paint chips). Processor 24 can be communicatively coupled to a memory 26 storing computer executable instructions that are readable and executable by processor 24. Such instructions can include an operating system 27 for the computing device 20 and a color selection application 28 that as described herein. However, it is to be appreciated that some or all of the instructions or associated data can be stored remotely from the computing device 20 for access over a network 36 if desired, and that the instructions and associated data need not be stored locally within the memory 26.

Computing device 20 can include one or more orientation sensors 30. Orientation sensors 30 can sense the physical orientation of computing device 20 (e.g., vertical, horizontal, etc.) and generate a corresponding orientation signal that is provided to the processor 24. Processor 24 can determine the current physical orientation of the computing device 20 from the orientation signal(s) and respond accordingly, such as by adjusting a displayed image based on the current orientation of the device. In embodiments, orientation sensors 30 can comprise one or more accelerometers, tilt sensors, gyroscopes, or other sensors configured to generate the orientation signal.

Computing device 20 can comprise a user interface. The user interface can include multiple devices that together provide the interface between the user and computing device 20. For example, the computing device 20 can include a touchscreen interface 32 having a display, various interface buttons hard or soft buttons (such as a power button, a selection button, or the like), speakers, microphones, and other input or output devices. Image sensing device 22 can also provide functionality as part of the user interface for computing device 20 in that it can be used to enter selected images into computing device 20. Computing device 20 can further include communications hardware 34 for communications over one or more networks 36. Example communications include both wired and wireless communications, such as Wi-Fi communications, communications via a cellular telephone system, BLUETOOTH communications, near field communications, and the like.

Figure 3:
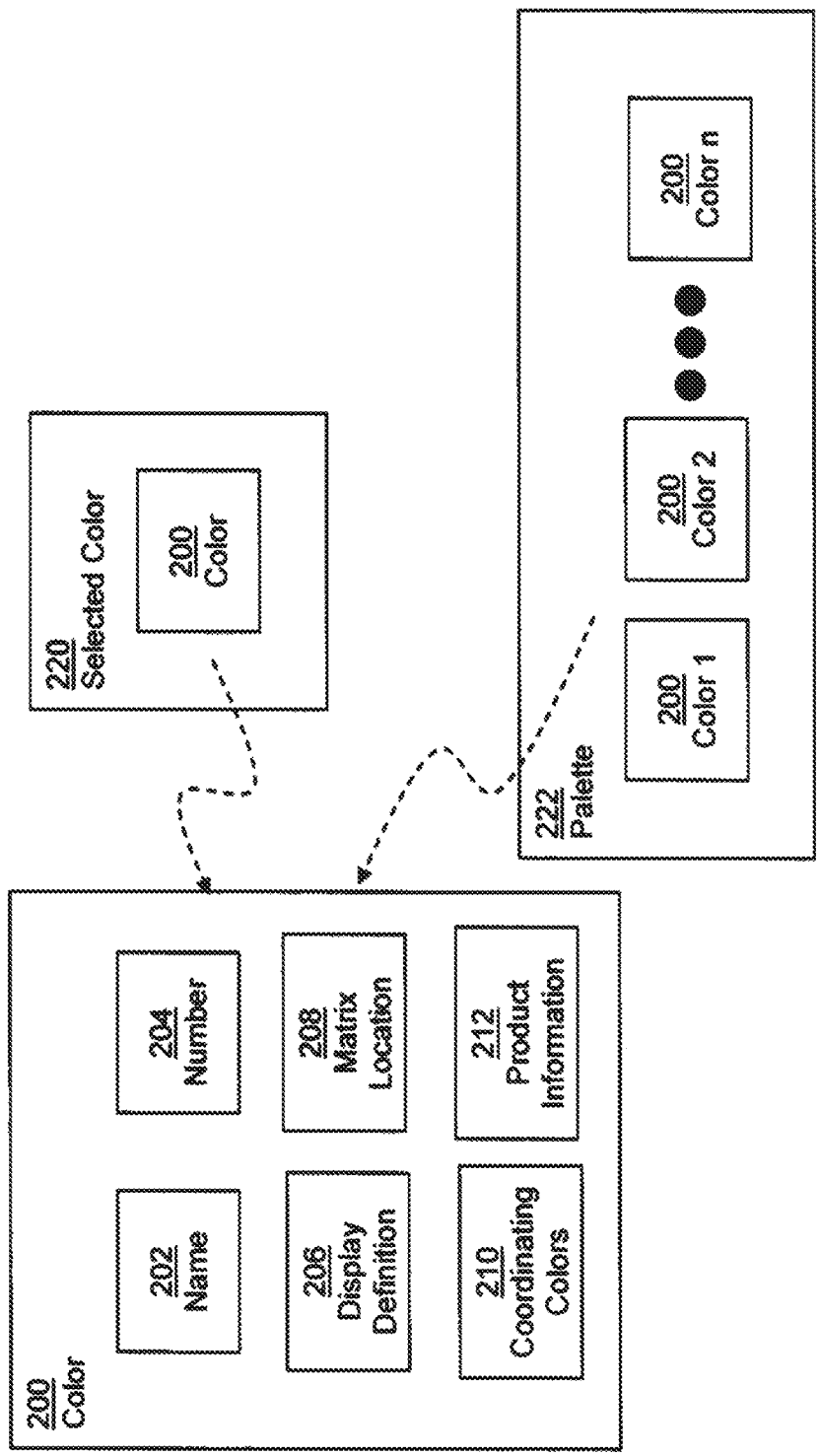
FIG. 3 is a block diagram depicting color data structures, according to an embodiment.

FIG. 3 is a schematic diagram depicting data elements of a color information data structure, referred here throughout as color 200. Each color 200 can be stored in memory 26. Color 200 can comprise a name 202, number 204 and/or other identifying indicia for the physical paint color represented by color 200. Color 200 can further comprise a display definition 206, which can comprise red/green/blue (RGB), hue/saturation/value (HSV), cyan/magenta/yellow/black (CMYK), or other computer-comprisable color definition format, enabling color 200 to be displayed by computing device 20. In embodiments, color 200 can further comprise matrix location 208 indicative of the relative arrangement of color 200 in a color matrix 100 (as described below with respect to FIGS. 5 and 6). In other embodiments, the relative arrangement of colors in color matrix 100 can be stored in an alternative data structure in embodiments. In embodiments, memory 26 can further store an active, or selected color 220, and palette 222. Selected color 220 can comprise a reference to a particular color 200. Palette 222 can comprise a data structure suitable to store a list or set of references to colors 200.

Color 200 can further comprise a set of references to one or more coordinating colors 210. Coordinating colors 210 can be precalculated and stored with color 200, or determined algorithmically at runtime. Coordinating colors 210 can be stored in a lookup table of coordinating colors in memory 26, or accessed through the network 36. Coordinating colors can be determined in various ways; for example, coordinating colors can be calculated from the color characteristics (e.g., red, green, and blue levels) of the selected color, determined from past user selections, or determined using other criteria, such as the colors of a school or other institution, the colors of a logo, the colors associated with a sports team, and the like.

Color 200 can further comprise product information 212. Product information 212 can include lists of compatible or incompatible paint, coating, sealant, or other products and pricing information.

Figure 4:
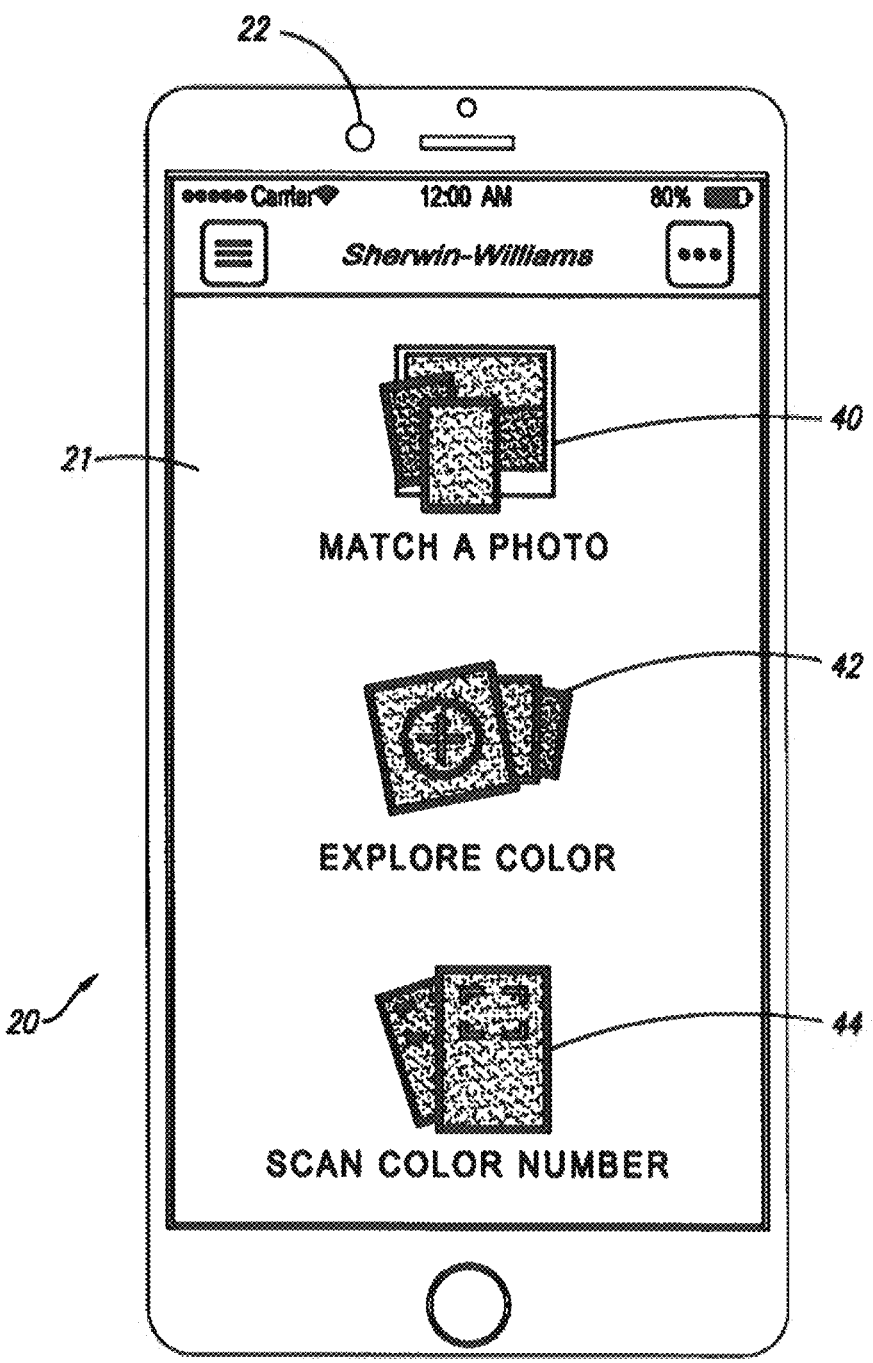
FIG. 4 is a layout view depicting a screen on a computing device, according to an embodiment.

Computing device 200 can display a number of interface screens during execution of color selection application 28. FIG. 4 depicts an initial screen 21 that provides a user with different options for selecting a color, according to an embodiment. Selecting (for example, by touching) the "match a photo" icon 40 can enable the user to choose a desired color found within an existing photo or from a new photo taken for the purpose of capturing and matching a desired color. Colors within a photo can be matched to predefined colors available for purchase using known color matching algorithms. Selecting the "explore color" icon 42 can enable the user to select a desired color from an array of predefined colors available for purchase. Selecting the "scan color number" icon 44 can initiate a subprogram in which a code, such as a color number, is captured and read by the computing device 20.

Figure 5:
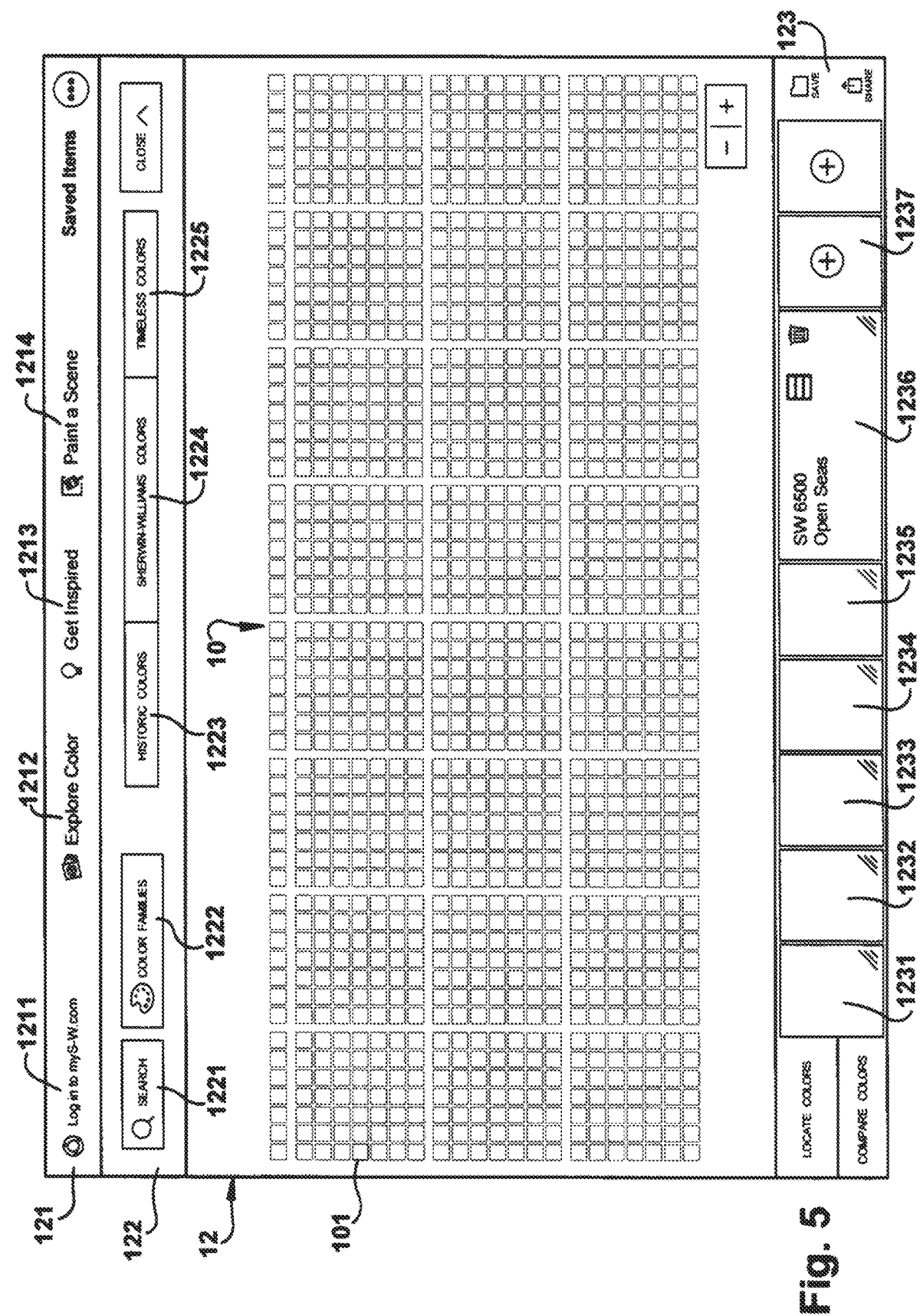
FIG. 5 is a layout view depicting a screen on a computing device, according to an embodiment.
Figure 6:
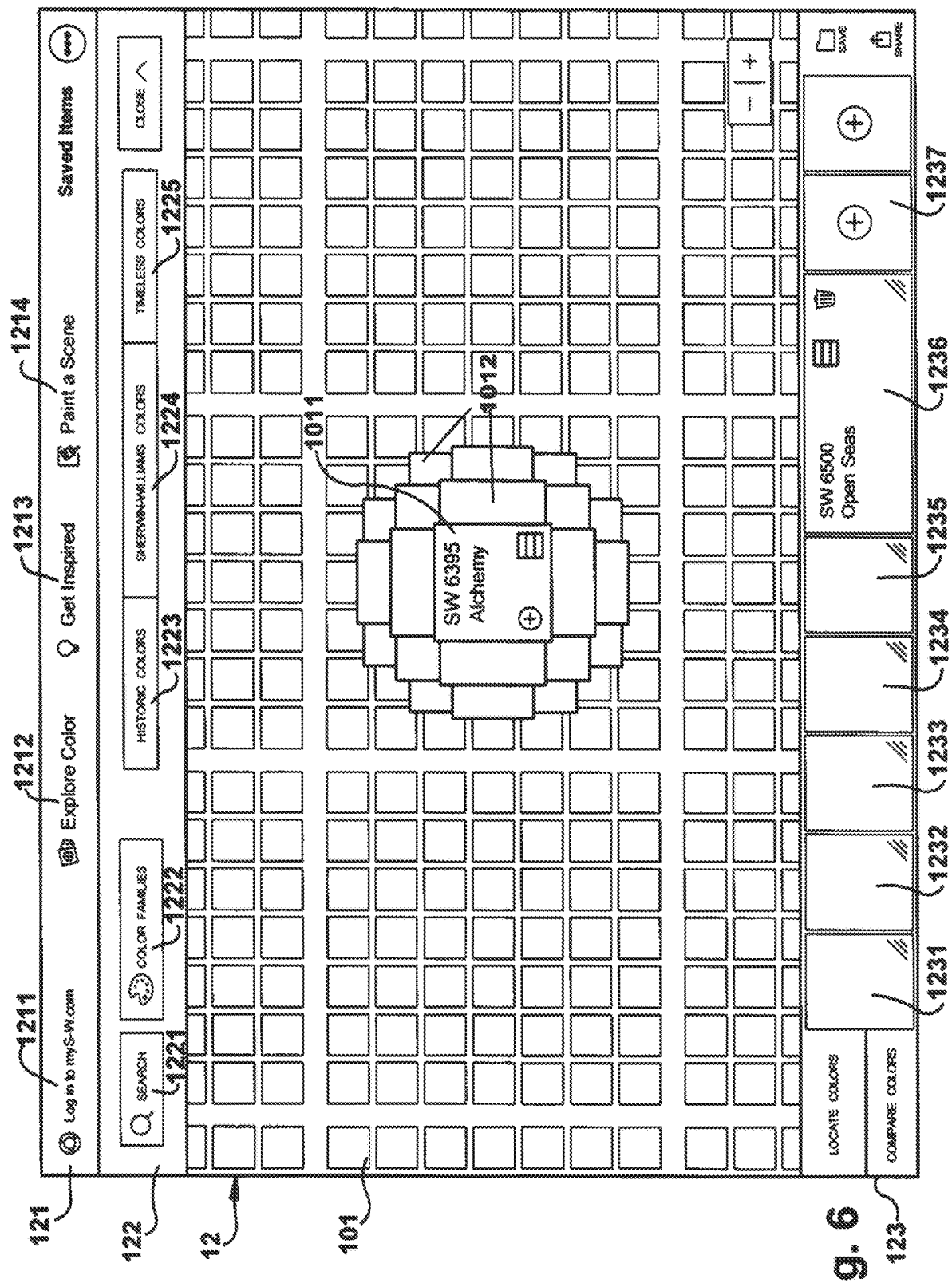
FIG. 6 is a layout view depicting a screen on a computing device, according to an embodiment.

FIGS. 5 and 6 depict interface screens that can be displayed when the "explore color" icon 42 is selected, according to an embodiment. A color matrix or array 100 (also referred to herein as the "color wall" or "digital color wall") can be displayed. Color matrix 100 can be a digital rendering of a large collection of individual colors 200 in squares or chips 101, as digital images or as a virtual display. Each chip 101 can be displayed based on the display definition 206 of the color 200 associated with chip 101. Color matrix 100 therefore presents a broad spectrum of colors for example in a spectral arrangement in groups of similar colors across the spectrum, red, yellow, green, blue, violet, etc. Each chip 101 can represent a specified paint color, and correspond to a physical color chip 12 which is stocked in physical display 10. The arrangement of chips 101 in color matrix 100 can be stored in memory 26, and configured such that chips 101 can be displayed in an layout that corresponds to the layout of physical chips 12 in physical display 10.

Figure 7:
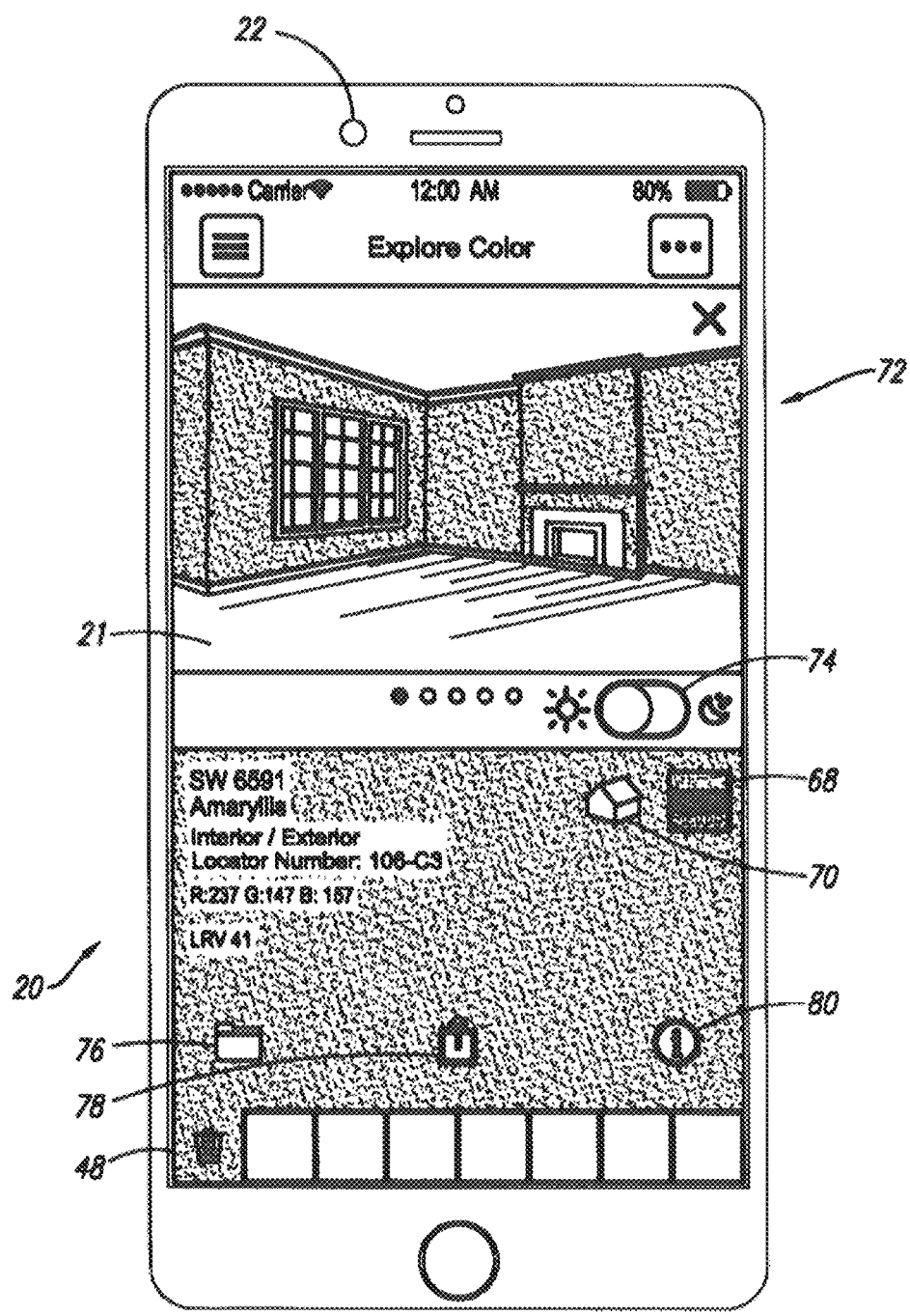
FIG. 7 is a layout view depicting a screen on a computing device, according to an embodiment.

Color matrix 100 can be displayed within a digitally rendered frame 120. Frame 120 can comprise a display of the entire color matrix 100 as depicted in FIG. 6, or zoomed in to display a subset of the colors as depicted in FIG. 7. When frame 120 displays a subset of the colors, the color matrix can be navigated by scrolling to different areas of the wall while zoomed in.

As depicted in FIG. 5, the individual chips 101 can be small, with little-to-no identifying information provided beyond the visual appearance of the shade of color. Any one of the chips 101 of color matrix 10 can be selected by touching, tapping or clicking on the chip 101. This can update the value of selected color 220 to refer to color 200 of chip 101. Selecting a chip 101 can cause the selected chip 1011 to be enlarged on the display and overlaid over the surrounding colors, such that the surrounding chips are partially obscured, as depicted in FIG. 6. Further, a plurality of neighboring chips 1012 can also be enlarged, and displayed such that they are overlaid over the surrounding colors and under the selected chip 1011. The relative size of the enlarged neighboring chips 1012 can be based on the distance of each neighboring chip 1012 from selected chip 1011. Any of the adjacent colors or any other colors in the array can be similarly selected by contact with the display.

FIG. 7 depicts a sample screen for a providing more detailed information related to selected color 220. In addition to the color name 202 and number 204, additional information can be displayed based on product information 212. For example, an interior/exterior identifier for the selected color can be provided. The interior/exterior identifier can indicate whether the selected color is available as an interior paint, exterior paint, or both. A locator number can represent the location of the corresponding paint chip for the selected color in the real world retail paint chip display. Red, green and blue (RGB) values for the selected color can be displayed with a light reflectivity value (LRV).

In embodiments, computing device 20 can access network 36 to retrieve additional information associated with selected color 220. For example, marketing messages or coupons related to products available in the selected color can be retrieved for display to the user. In embodiments, information related to a retail store where related products are available can be provided.

Color matrix 100 can therefore assist a user in accessing paint chips 12 in a real world retail paint chip display 10. Via an input on the computing device 20, the user can signal the smartphone to "locate" one or more selected colors in the virtual paint chip arrangement. The color matrix 100 will then be displayed with the selected colors highlighted in the virtual paint chip arrangement. By comparing the virtual paint chip arrangement of color matrix 100, in which the selected colors are highlighted, to the real world retail paint chip display, the user can quickly find the paint chips corresponding to the selected colors in the real world retail paint chip display.

The input for initiating the display of the color matrix 100 can be through a real or virtual button on the computing device 20. Additionally or alternatively, the input can be via a physical movement or reorientation (e.g., rotation, shaking, etc.) of the computing device 20. As discussed above, the computing device 20 can include orientation sensors for sensing the physical orientation of the smartphone. The processor within the computing device 20 can receive the orientation signals and cause color matrix 100 to be automatically displayed based on the orientation of the smartphone. For example, as depicted in FIG. 7 when selecting colors for addition to the color palette 222, the computing device 20 can have a substantially vertical orientation, and the displayed interface screen image can have a portrait orientation. When the computing device 20 is rotated away from a substantially vertical orientation, e.g., toward a substantially horizontal orientation, such as that depicted in FIG. 5, the previous image can be automatically replaced with a new interface screen image having a landscape orientation and showing the virtual paint chip arrangement. Thus, a user can display the physical location of paint chips in the real world retail display simply by rotating the computing device 20 after the colors are selected.

FIG. 7 further depicts examples of various icons 76, 78, 80 for triggering actions or functions associated with the selected color 220 and/or the color palette 222. A save icon 76 can be provided for saving a selected color and/or color palette 222. Touching the save icon 76 can cause the selected color 220 and/or color palette 222 to be saved in the memory 26, or to a location accessible to computing device 20 via network 36. A share icon 78 can be provided for triggering a share action, to share the selected color 220 and/or color palette 222 to a social network or via email or other messaging systems. A color details icon 80 can be provided for triggering the display of still further information about a selected color. For example, touching the color details icon 80 can trigger the display of additional available colors. The additional available colors can be arranged, with respect to the selected color, according to lightness level, saturation level and/or hue (e.g., HSL values).

Returning now to FIG. 5, additional frames 121, 122, 123 which can provide navigation and control functions to the user. For example, frame 121 may include a link 1211 to a related website or application of a paint manufacturer, an Explore Color button 1212 which can be configured to reset the display to the entire color matrix 100 or any subset thereof, or link to other functions of the system such as color scanning or photo matching. A Get Inspired button 1213 can be configured to provide links to photos or renderings of painted scenes such as interior rooms painted particular colors, or to display painted scenes alongside a collection of individual colors. A Paint a Scene button 1214 can be configured to link to digital renderings of interior room scenes or building or object exteriors, as depicted and described with respect to FIG. 8? below.

Frame 122 can present SEARCH button 1221, which can be configured to enable searching for a color from the matrix by name or number. A Color Families button 1222 can be linked to related buttons of color families by name, such as Reds, Oranges, Yellows, Greens, Blues, etc., each of which is linked to display those color families from the color matrix. Additional buttons, such as Historic Colors 1223, colors of a particular paint company 1224, and Timeless Colors 1225 can be configured to display those corresponding collections within frame 12.

Frame 123 can comprise areas 1231-1236 for display of colors stored in palette 222. Areas 1231-1236 can therefore represent a virtual color palette 222. Additional, or different, colors can be added to the color palette by an add-a-color button 1237 in frame 123. Colors can also be added to palette 222 by first selecting color 200.

Figure 8:
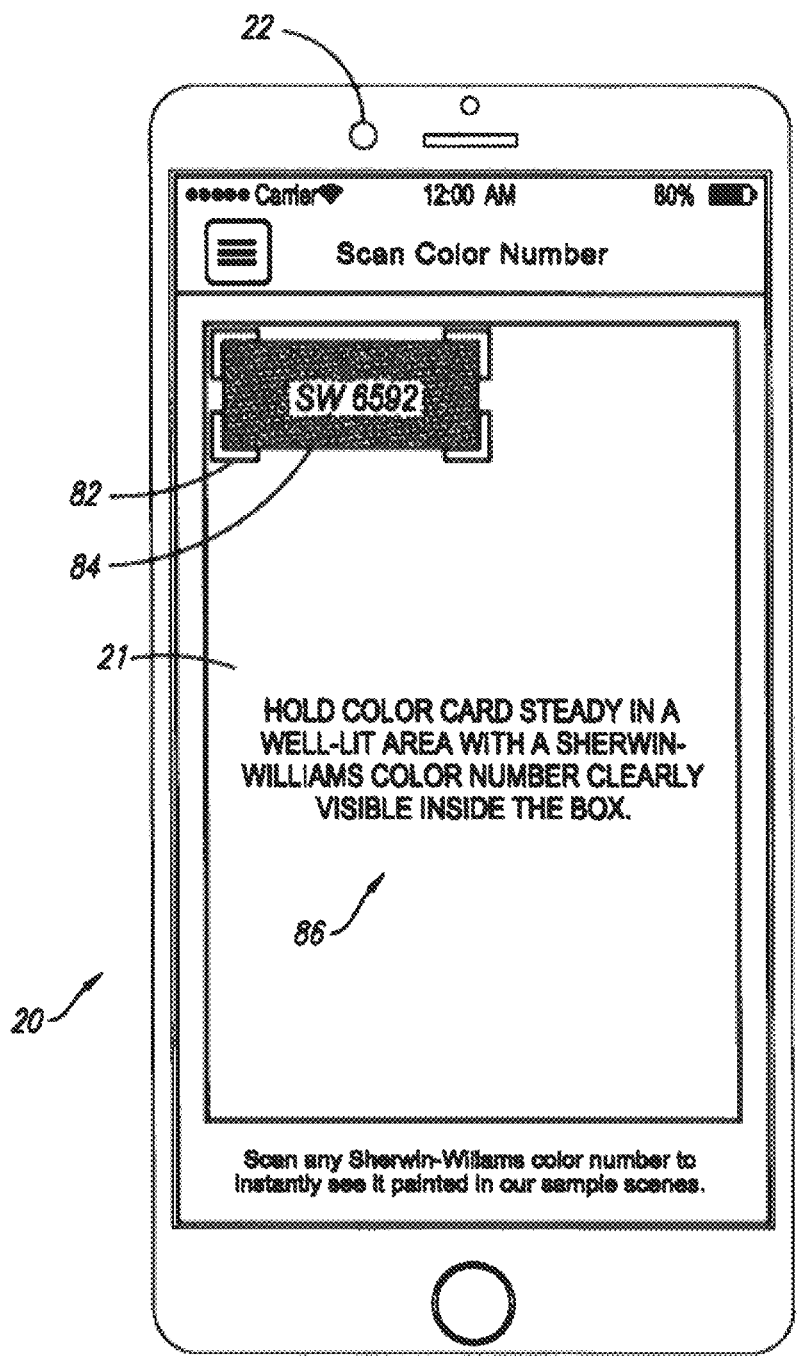
FIG. 8 is a layout view depicting a screen on a computing device, according to an embodiment.

As depicted in FIG. 8, an interface screen can enable the user to scan a color number or code from a physical chip 10 (or other source) in which an image of a code that identifies a color available for purchase can be captured by a camera (such as one integrated in a smartphone, tablet, or other portable electronic device), and the code is read by the color selection application to select the color. The code can be any type of code capable of being recognized by a smartphone, such as an alphanumeric code (e.g., the color number), a conventional or matrix bar code, etc. If the code is a color number or other alphanumeric code, the color selection application can include an optical character recognition (OCR) routine for recognizing the color number. The result of the OCR can be compared to a database of color numbers, stored in the smartphone or remotely, to identify the scanned color number. In certain embodiments, the color name itself can be scanned and recognized to select the color. Scanning the color number and/or name to select a color can be useful because such information is typically printed on the color's paint chip, or a can of paint containing the color, or other documentation concerning paints available for purchase (e.g., a brochure).

After scanned identifying indicia is recognized as corresponding to a color available for purchase, the successful scan can be indicated to the user via displayed textual or graphical information, vibrating the smartphone or other device, playing an audible tone, etc. A color selected by scanning can be automatically added to the virtual color palette, or a prompt can be provided to manually add the selected color to the virtual color palette. Upon selecting a color by scanning its identifying indicia, the location of the color's paint chip in the virtual paint chip arrangement can be displayed as described above.

The screen can provide a target window 82 for facilitating the proper alignment and sizing of the image of the color number 84. The OCR routine can be performed on the image within the target window 82. The interface screen can also provide instructions 86 to the user as shown. If the OCR is unsuccessful, a text entry box can be displayed to allow the user to manually enter the color number or color name.

Figure 9:
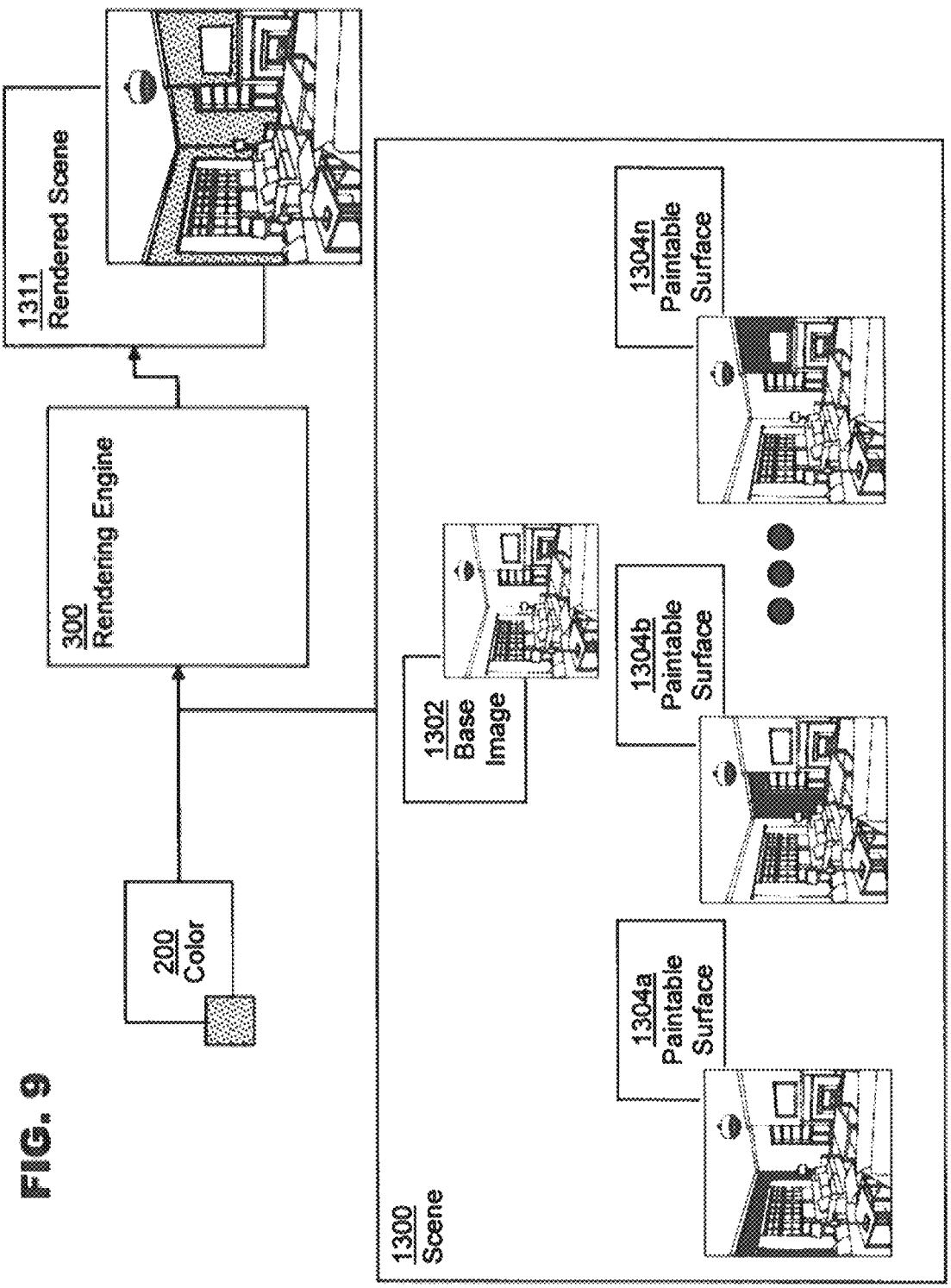
FIG. 9 is a block diagram depicting data structures and components of a computing system, according to an embodiment.

In one aspect of the present disclosure, one or more colors 200 from palette 222 or selected color 220 can be applied to paintable surfaces of an image or scene. FIG. 9 is a schematic diagram depicting a data structure for a scene 1300 for rendering by a rendering engine 300. Scenes 1300 can be stored in memory 26. Each scene 1300 can comprise a base image 1302, which can be a photograph, digital painting, vector graphic, or any other image type. Base image 1302 can be stored as native, raw, graphical image format (GIF), portable native graphics (PNG), tagged image file format (TIFF), or any other image storage format. Scene 1300 can further comprise one or more paintable surfaces 1304. Each paintable surface 1304 can comprise a mask, layer, alpha channel, or other format indicating an area of base image 1302 that can be overlaid with a chosen color 200 by rendering engine 300 to produce rendered scene 1311. In embodiments, paintable surfaces 1304 can further comprise opacity, luminance or filtering information such that color 200 can be applied at different intensities or with other color-altering effects to individual areas of each paintable surface 1304.

This can enable rendering engine 300 to account for lighting, shadows, and reflections. While a single color 200 is depicted in FIG. 9, in embodiments, rendering engine 300 can receive a selection of multiple colors 200 and associated paintable surfaces 1304, such that each paintable surface 1304 can be rendered using a different color 200, Rendering engine 300 can be configured to desaturate base image 302, normalize the brightness and contrast, and apply a color luminance blend based on the chosen color and paintable surfaces 1304.

Figure 10:
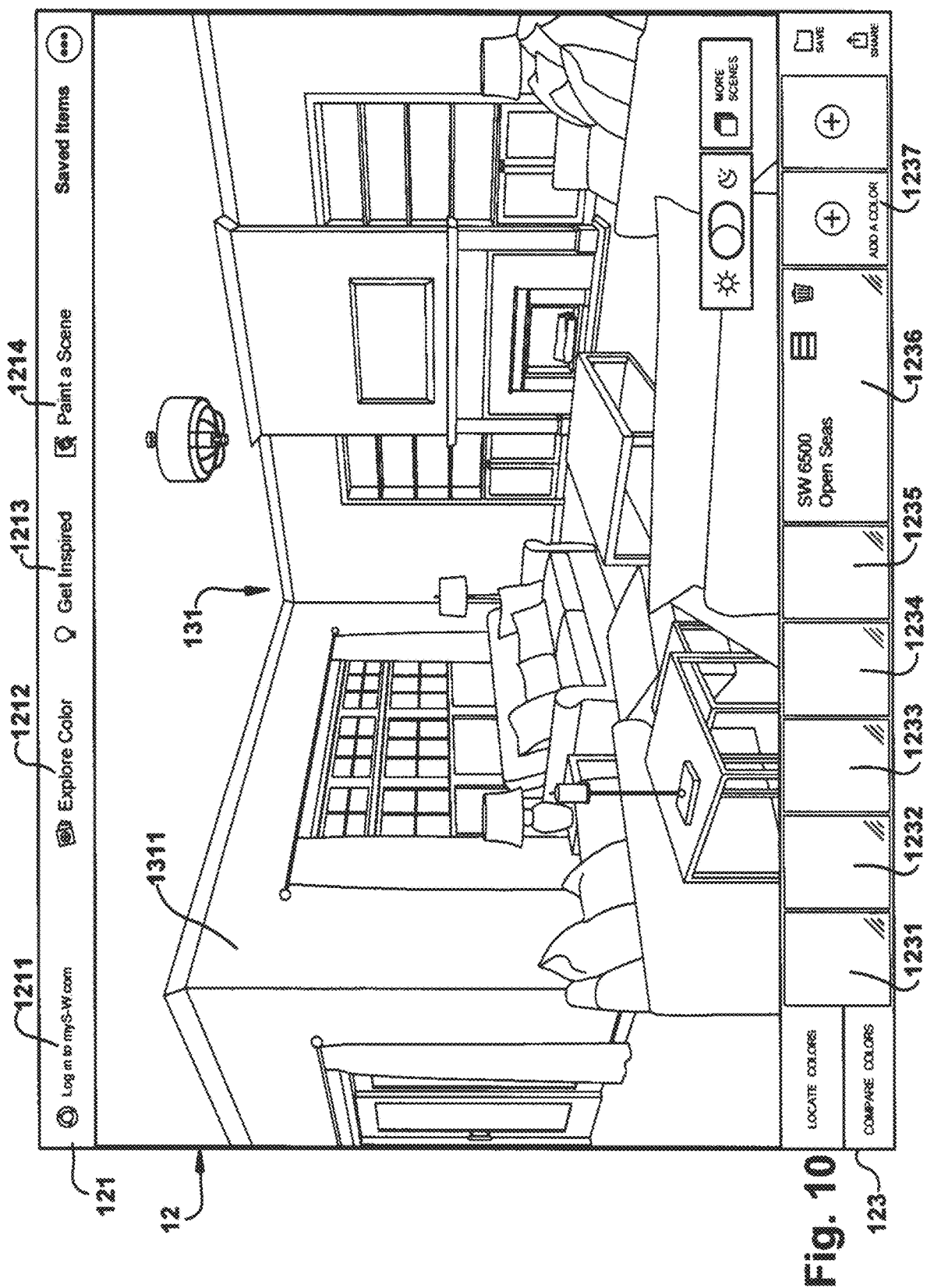
FIG. 10 is a layout view depicting a screen on a computing device, according to an embodiment.
Figure 11:
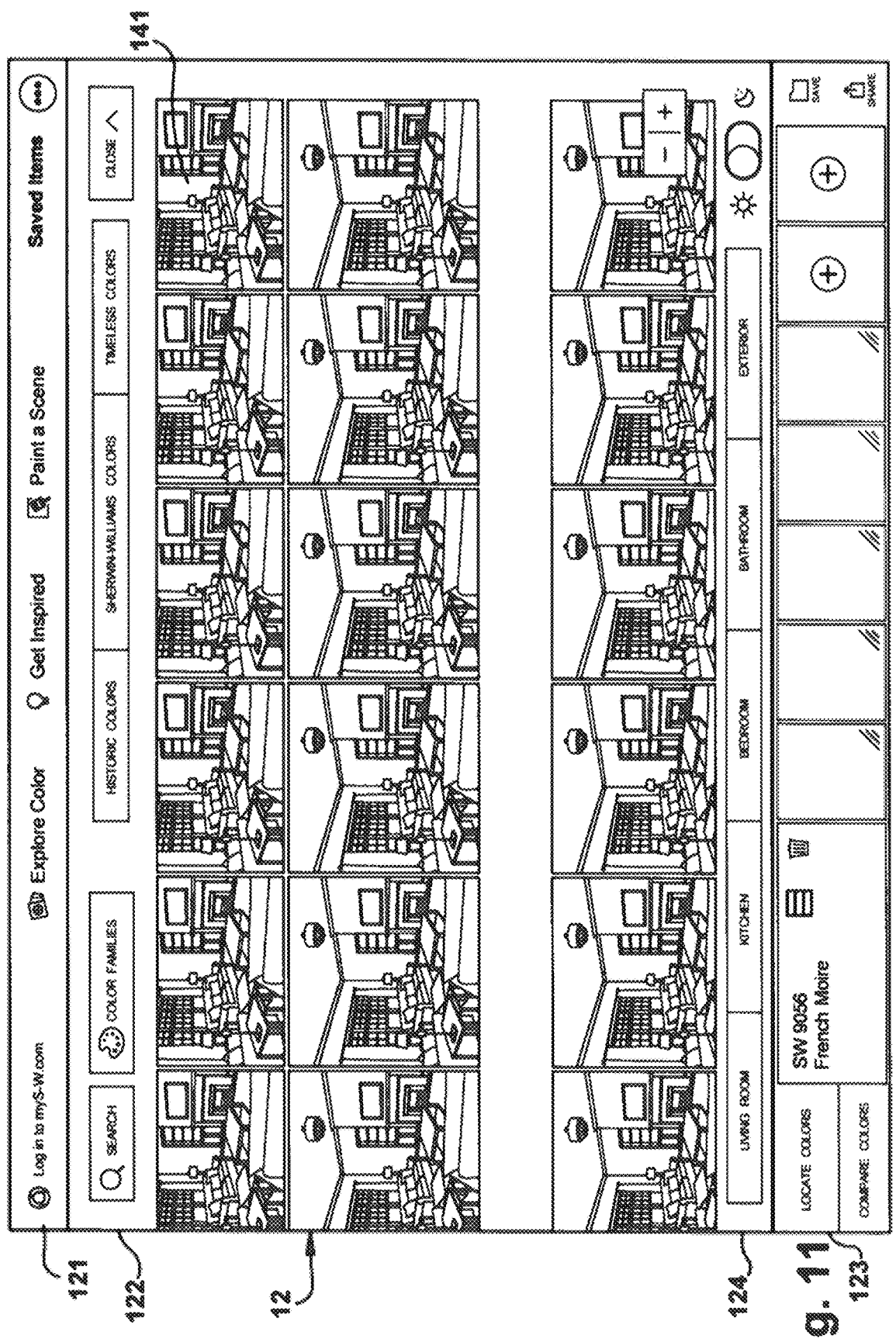
FIG. 11 is a layout view depicting a screen on a computing device, according to an embodiment.

As depicted in FIG. 10, rendered scene 1311 can be displayed within frame 121. As colors 200 of palette 222 are selected at 1231-1236, rendered scene 1311 can be updated to display the selected color or colors 200 on the appropriate paintable surfaces. The user can apply a selected color or colors 200 to an interior or exterior scene by selecting the scene and tapping on the scene at an area where the color is to be applied. In embodiments, one or more scenes 1300 may be related such that a first scene is a day version and a second scene is a night version. A toggle control 1238 can enable the user to move between a day version and a night version of the selected scene.

Figure 12:
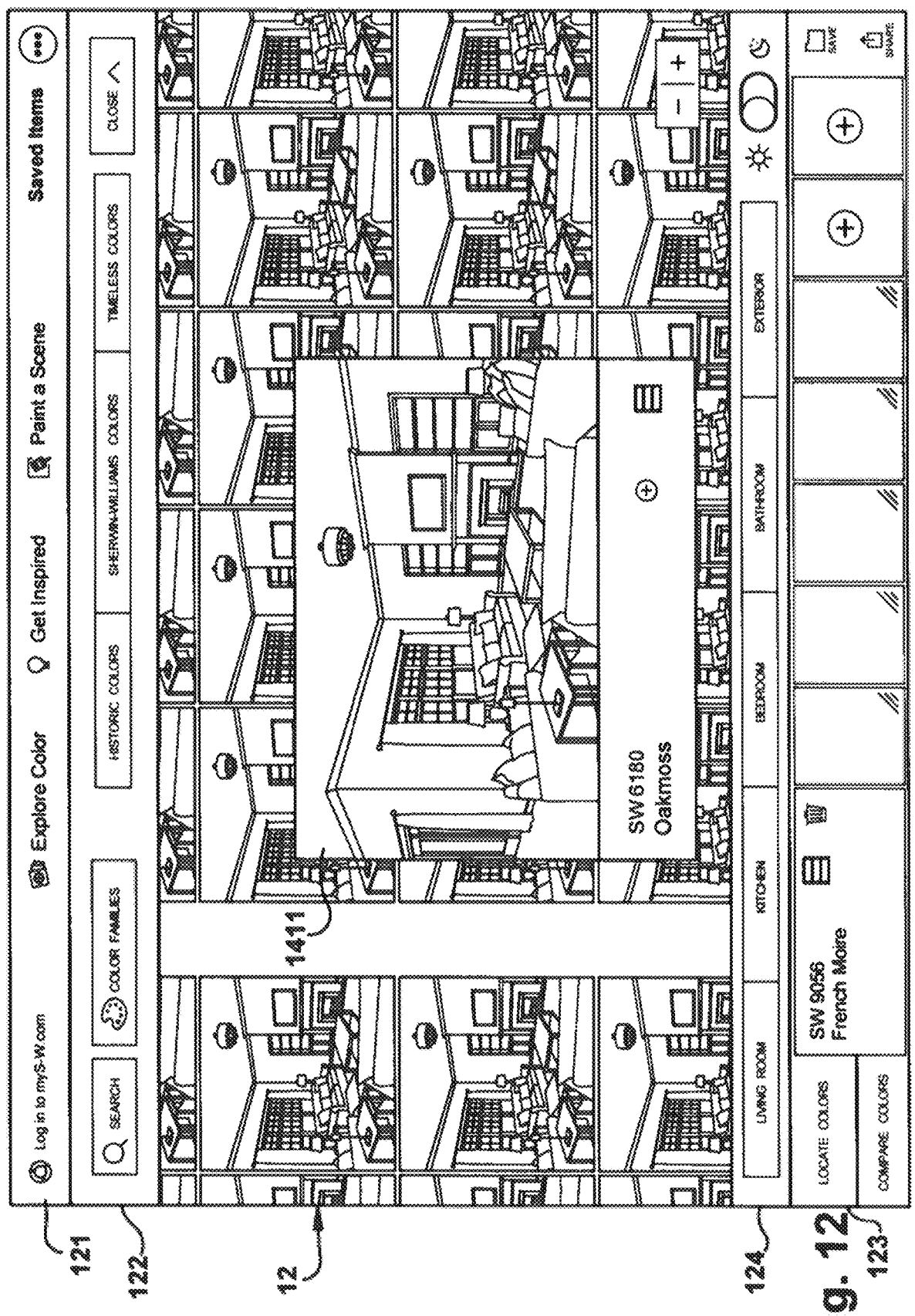
FIG. 12 is a layout view depicting a screen on a computing device, according to an embodiment.

As depicted in FIG. 12, color matrix 100 can be displayed such that each color 200 is represented by a scene chip 141. Each scene chip 141 can be a version of scene 1300 rendered such that paintable surfaces 1304 are overlaid with appropriate color 200. Color matrix 100 therefore presents a "kaleidoscope" style view in which a single scene is displayed with chosen colors based on the location of scene chip 141 in color matrix 100. Frame 124 can include scene selection buttons 1240. Each scene selection button 1240 can enable the user to select a scene for display in color matrix 100.

Any one of the scene chips 141 of color matrix 10 can be selected by touching, tapping or clicking on scene chip 141. This can update the value of selected color 220 to refer to color 200 of scene chip 141. As depicted in FIG. 12, selecting a scene chip 141 can cause the selected scene chip 1411 to be enlarged on the display and overlaid on the surrounding chips, such that the surrounding chips are partially obscured. Information about the color 200 of selected scene chip 1411, such as name 202 and number 204 can be displayed.

Figure 13:
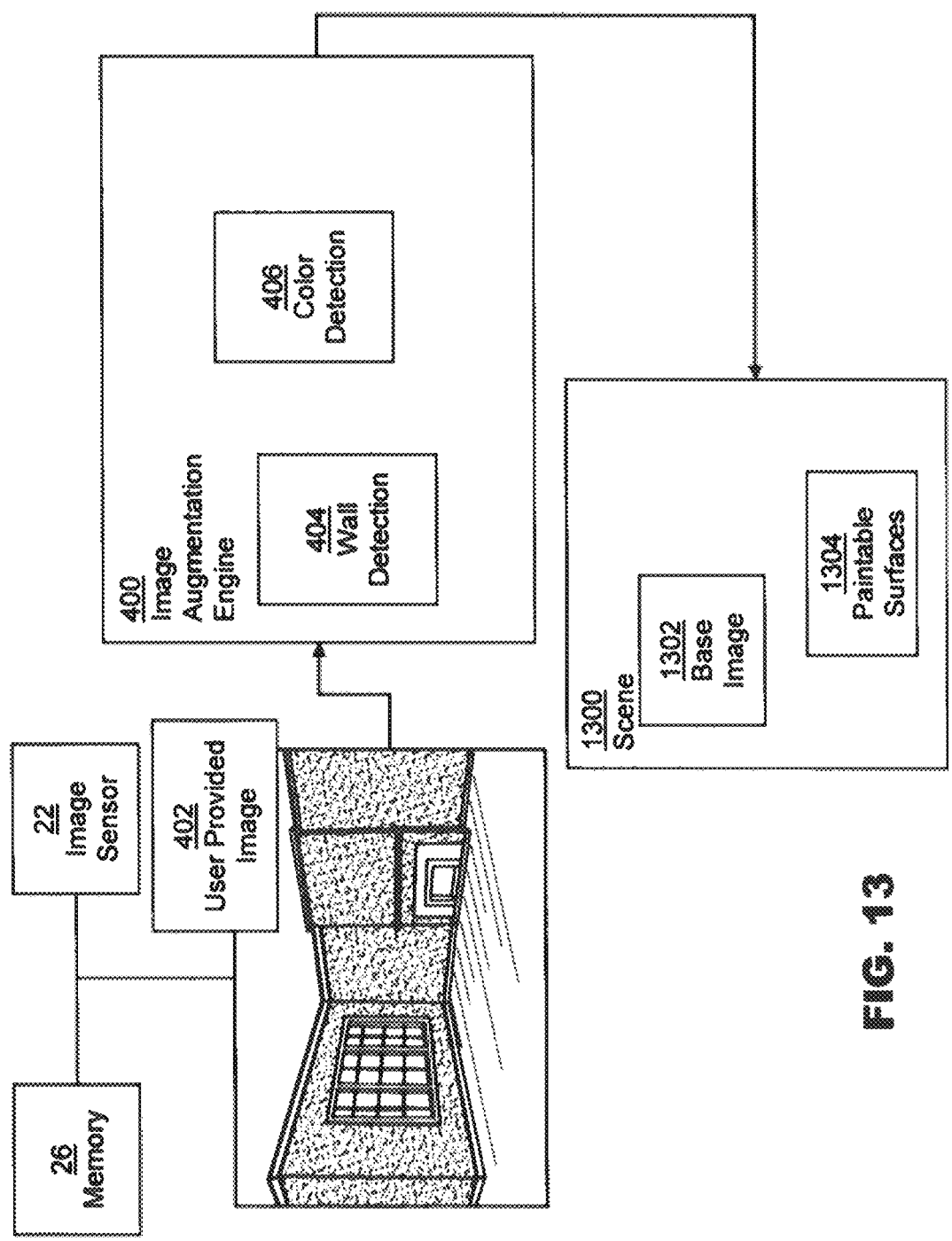
FIG. 13 is a layout view depicting data structures and components of a computing system, according to an embodiment.

In embodiments, scenes 1300, including base images 1302 and paintable surfaces 1304 can be pregenerated and stored with application 28. As depicted in FIG. 13, in embodiments scenes 1300 can also be generated based on user-provided image 402 inputs by one or more image augmentation engines 400.

In embodiments, user-provided image 402 can be a static image. In a TAKE A PHOTO mode, the computing device 20 can control operation of the image sensor 22 to capture one or more images, upon request by the user for use as user-provided image 402. In an CHOOSE A PHOTO mode, the user can select an existing photo, for example a photograph or other image file that exists in memory 26, or at a network location (such as a database of stock images, a website, or other location accessible via network 36). In an INSTANT PAINT mode, user-provided image 402 can be received from image sensor 22 in real-time, such that rendering engine 300 can modify the display of rendered image 1311 as the real-time image from image sensor 22 is updated.

The images captured by the image sensor 22 in the INSTANT PAINT mode are described herein as being "real-time" images because objects in view of the image sensor 22 are displayed by a touch-sensitive screen 32 of the computing device 20. As the computing device 20 is moved to change the field of view of the image sensor 22, the images displayed by the display screen 32 are also changed. According to such embodiments, the screen 32 serves as a viewfinder for the image sensor 22, displaying objects currently in the image sensor's field of view and changing the displayed objects concurrently with movement of the computing device 20.

Image augmentation engine 400 can comprise a wall detection module 404. Wall detection module 404 can receive provided image 40 and execute a wall detection algorithm to recognize a planar surface within the provided image 402, such as, for example a wall. Wall detection engine 404 can utilize color recognition to identify large surface areas bearing the same color, edge detection to identify one or more corners, and/or any other suitable methods or parameters to identify a planar surface, such as wall. A definition of identified planar surfaces can be stored as a paintable surface 1304 within scene 1300 for rendering.

In addition to the locations of planar surfaces, the colors of various regions within provided image 402 can be determined by color detection engine 406. Colors recognized by color detection engine 406 can be stored in palette 222, and displayed with user provided image 402. In response to the selection of a color 200 displayed in palette 222 by the user, the appearance of one or more of paintable surfaces 1304 can be modified by rendering engine 300 to be overlaid with the selected color 200. Application 28 can further enable the user to save a rendered scene 1311 as a static image.

In embodiments, color detection engine 406 uses a quadtree or other space filling algorithm to split the original image into smaller areas or regions for processing. A centroid or other averaging algorithm can be used to determine the most prevalent color in a region. A color matching algorithm can then be used to determine a paint color that is the closest match for the color in a given region within the original image.

A ranking mechanism can be used to sort groups of regions based on the number of different colors in the group and the size of the group. The top 'n' such groups can be selected as the regions to show with the determined color.

In an embodiment, image augmentation engine 400 can comprise, or interact with, one or more augmented reality engines 408. Augmented reality engine 408 can receive provided image 402 and produce world space data. World space data can be used to detect planar surfaces. Lighting data provided by augmented reality engine 408 can provide fine-tuned edge detection.

Figure 14A:
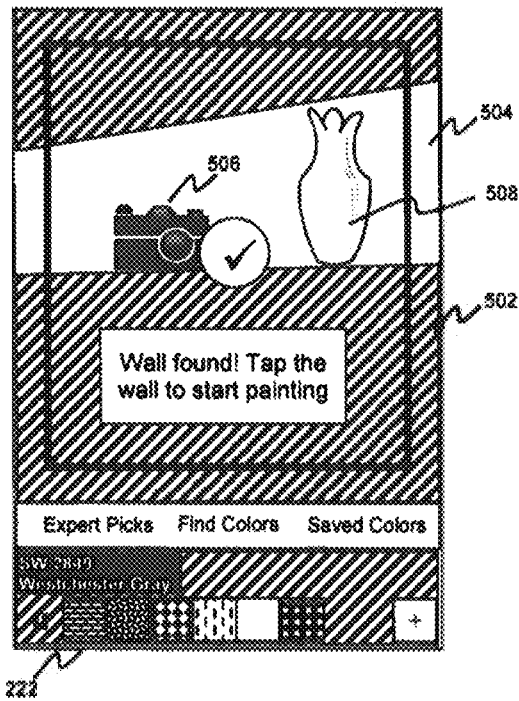
FIGS. 14A and 14B are layout views depicting screens on a computing device, according to an embodiment.
Figure 14B:
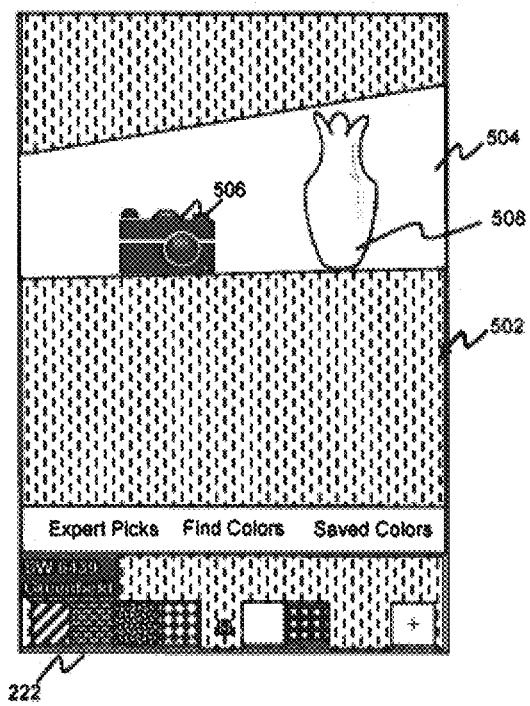
Figure 15B:
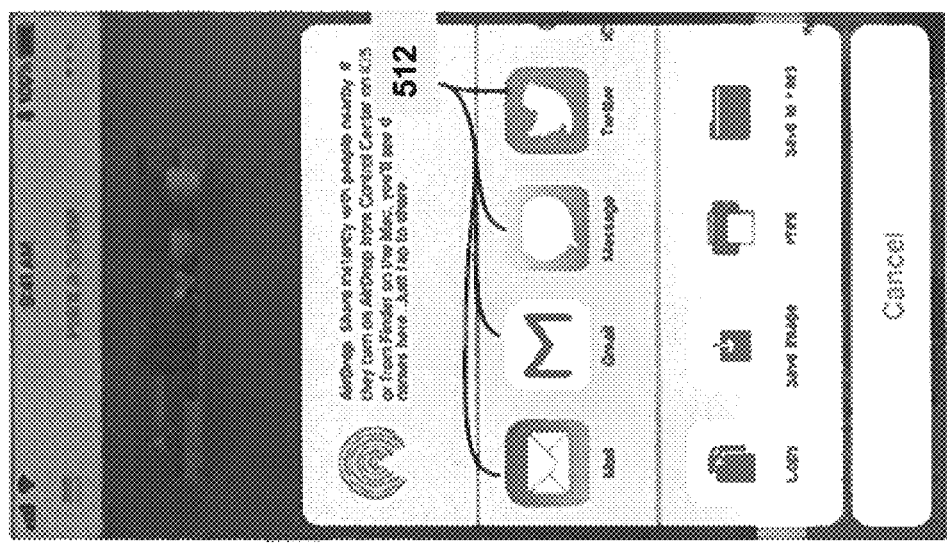
FIGS. 15A and 15B are layout views depicting screens on a computing device, according to an embodiment.
Figure 15A:
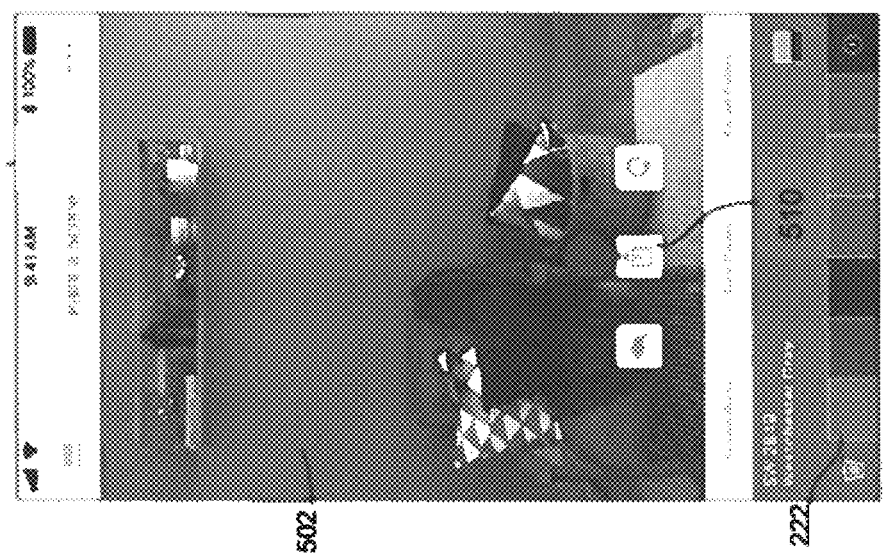

FIGS. 14A and 14B depict user interface screens that can be provided in an INSTANT PAINT mode, according to an embodiment. As depicted in FIG. 15A, the user can be informed when a planar surface, such as a wall 106 is found. The color of the wall 106, as well as various objects (such as, the depicted shelf 112, camera 114, and flower pot 116) can be detected and added to palette 222. As depicted in FIG. 13B, in response to user's selection of a color from the palette, the wall 106 can be instantly updated.

Figure 16:
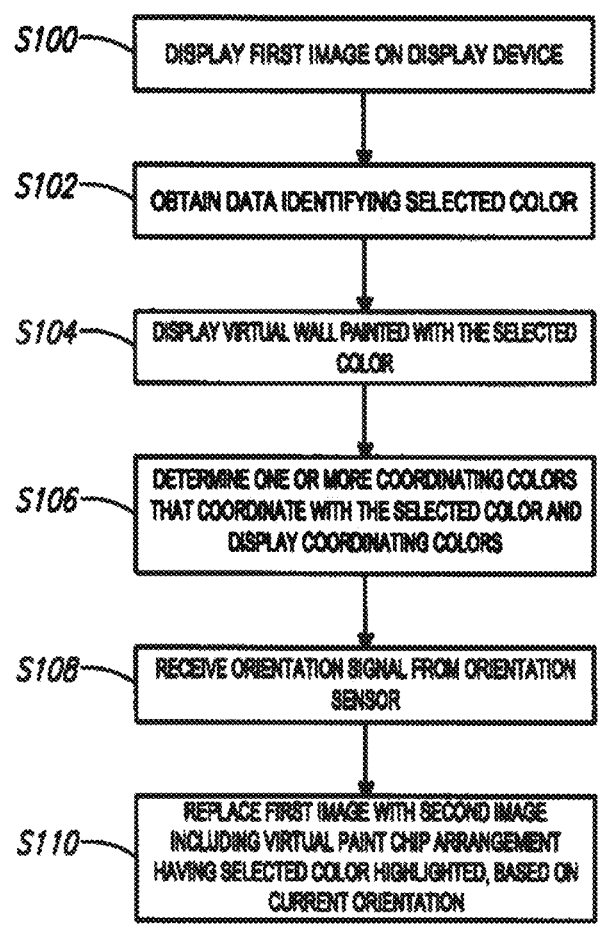
FIG. 16 is a flowchart depicting a method for displaying images on a computing device, according to an embodiment.

Regardless of how a preview of an object's color is generated, a still image of the preview can be transmitted from the computing device 20 to be delivered to a remote terminal through network 36. For example, with reference to FIGS. 16A and 16B, the user can select a "share" icon 122 displayed by the display screen 32. In response to selection of the share icon 122, the computing device 20 can be configured to present at least one, and optionally a plurality of communication options 124. Examples of the communication options include, but are not limited to: email, SMS text communications, social media (e.g., Twitter, Facebook, Instagram, etc.), and the like. Selection of one or more of the communication options 124 allows the user to enter the relevant destination information (e.g., phone number for SMS text transmission, email address for email transmission, social media account information, etc.) for the selected communication option 124. The user can then confirm their choice to send the still image to that intended destination, and cause the computing device 20 to transmit the still image over the wide area network.

FIG. 17 is a partial flow diagram of example method steps for selecting and displaying a paint color and other information. The elements in the flow diagram are ordered serially for convenience, and the flow diagram is not intended to convey any particular order for performing the various steps. At S100, a first image is displayed (e.g., on the touchscreen of a smartphone). Data that identifies a selected color is obtained, e.g., by the processor in the smartphone (at S102). Obtaining data that identifies a selected color can include manually selecting the color as discussed above and/or capturing image data that includes the selected color and recognizing the selected color from the captured image (e.g., by an OCR process or by direct color recognition from colors within the captured image).

The displayed first image can include an array of different colors and the selected color can be selected from among the different colors. The first image can also include the virtual color palette showing a plurality of selected colors. Selected colors can be highlighted in the array of different colors as discussed above, and colors adjacent to the selected colors can also be highlighted. The colors can be highlighted by increasing the respective sizes of color icons in the array as depicted in FIG. 6. After a color is selected, a virtual wall painted in the selected color can be displayed (at S104). Further, at S106, coordinating colors that coordinate with the selected color can be determined (e.g., by the processor) and displayed. At S108, the processor can receive an orientation signal from an orientation sensor. Based on a current orientation of the smartphone, the first image can be automatically replaced with a second image that includes a virtual paint chip arrangement corresponding to a real world retail paint chip display, and the selected color can be highlighted in the virtual paint chip arrangement at S110. Rotation of the smartphone from a first orientation (e.g., substantially vertical) to a second orientation (e.g., substantially horizontal) can be determined, and the first image can be automatically replaced with the second image when the smartphone is so rotated. The first image can have a portrait orientation and the second image can have a landscape orientation.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

In one embodiment, the computing device 20 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A color selection and display system comprising:
    a computing device comprising:
        a display;
        a memory storing a color matrix comprising a plurality of virtual paint chips, each virtual paint chip representing a color, and one or more scenes, each scene comprising a base image and at least one paintable surface, the paintable surface defined by a plurality of locations in the base image;
        a user interface configured for receiving input data identifying a selected color represented by a virtual paint chip; and
        a processor configured to:
            control the display to automatically display the color matrix such that the selected color is highlighted in the color matrix, and
            control the display to automatically display a rendered scene, the rendered scene comprising a display of the base image of a selected scene of the one or more scenes, with a chosen paint color applied to the at least one paintable surface of the selected scene.

2. The system of claim 1, further comprising:
    a retail paint chip display comprising a plurality of paint chips, each paint chip representing a paint color, the plurality of paint chips arranged according to a specified layout;
    wherein a relative location of each virtual paint chip in the color matrix corresponds to the specified layout of the retail pain chip display.

3. The system of claim 1, wherein the computing device further comprises an orientation sensor configured to generate an orientation signal based on an orientation of the computing device, and wherein the processor is further configured to receive the orientation of the computing device and to control the display to automatically display the color matrix based on the orientation of the computing device.

4. The system of claim 1, wherein the computing device is further configured to display a subset of the plurality of paint colors in a palette.

5. The system of claim 1, wherein the computing device is further configured to display the color matrix such that each virtual paint chip displays the rendered scene with the chosen color corresponding to the color of the virtual paint chip.

6. The system of claim 5, wherein the computing device is further configured to display an enlarged version of the rendered scene on the display over the color matrix.

7. The system of claim 5, wherein the computing device is further configured to display an enlarged version of the rendered scene, such that the chosen color is chosen based on a location of user contact of the display on the palette.

8. The system of claim 5, wherein the computing device is configured to display a zoomed portion of the color matrix.

9. The system of claim 1, wherein the computing device is configured to change the display to a second rendered scene in response to a user selection of a second selected scene of the one or more scenes.

10. The system of claim 9, wherein the computing device is further configured display at a group of available scenes simultaneously with the rendered scene, and further wherein the display of the second rendered screen has a chosen color based on the chosen color of a first rendered scene.

11. The system of claim 1, wherein the at least one paintable surface includes intensity information such that the paintable surface can be displayed with the chosen color based on the intensity information.

12. The system of claim 1, wherein the one or more scenes are generated by using a user-provided image as the base image and generating the at least one paintable surface from the base image.

13. The system of claim 12, wherein the at least one paintable surface is generated by detecting a wall.

14. The system of claim 12, wherein the scene further comprises one or more detected colors.

15. The system of claim 12, wherein the user-provided image is selected from an image in the memory.

16. The system of claim 15, wherein the user-provided image is a static image.

17. The system of claim 12, wherein the computing device further comprises an image sensor and the user-provided image is provided by the image sensor.

18. The system of claim 12, wherein a plurality of user-provided images are streamed from the image sensor and the display of the rendered screen is updated in real-time based on a current user-provided image.

19. A method for receiving a user selection of a color, the method comprising:

storing, in the memory of a computing device:
    a color matrix comprising a plurality of virtual paint chips, each virtual paint chip representing a color, the relative location of each virtual paint chip in the color matrix corresponding to a specified layout, and
    one or more scenes, each scene comprising a base image and at least one paintable surface, the paintable surface defined by a plurality of locations in the base image; and displaying the color matrix on the display of the computing device by displaying a rendered scene for each virtual paint chip, the rendered scene comprising a display of the base image of a selected scene of the one or more scenes, with the color represented by the virtual paint chip applied to the at least one paintable surface of the selected scene.

\* \* \* \* \*